United States Patent
Cowham

(10) Patent No.: US 8,140,461 B2
(45) Date of Patent: Mar. 20, 2012

(54) SYSTEM AND METHOD FOR IDENTIFYING CONFLICTING NETWORK ACCESS RULES AND CREATING A RESOLVED CONSEQUENCE

(75) Inventor: Adrian Cowham, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1031 days.

(21) Appl. No.: 12/079,021

(22) Filed: Mar. 24, 2008

(65) Prior Publication Data

US 2009/0240645 A1 Sep. 24, 2009

(51) Int. Cl.
*G06N 5/02* (2006.01)
*G06F 15/167* (2006.01)

(52) U.S. Cl. .................... 706/48; 709/225; 709/226

(58) Field of Classification Search .............. 706/48
See application file for complete search history.

(56) References Cited

U.S. PATENT DOCUMENTS

| | | | |
|---|---|---|---|
| 7,200,662 B2 | 4/2007 | Hasan et al. | |
| 7,213,068 B1 * | 5/2007 | Kohli et al. | 709/225 |
| 7,221,945 B2 | 5/2007 | Milford et al. | |
| 7,260,840 B2 | 8/2007 | Swander et al. | |
| 7,287,063 B2 | 10/2007 | Baldwin et al. | |
| 7,308,711 B2 | 12/2007 | Swander et al. | |
| 2004/0250131 A1 | 12/2004 | Swander et al. | |

OTHER PUBLICATIONS

Chadha, A Cautionary Note About Policy Conflict Resolution [online], 2006 [retrieved on May 20, 2011]. Retrieved from the Internet< URL: http://ieeexplore.ieee.org/xpls/abs_all.jsp?arnumber=4086684>.*

Dong et al., Flexible Resolution of Authorisation Conflicts in Distributed Systems [online], 2008 [retrieved on May 20, 2011]. Retrieved from the Internet< URL: http://www.doc.ic.ac.uk/~cd04/papers/dsom08.pdf>. (Date for Chadha).*

Flegkaset al., Dynamic Policy Analysis and Conflict Resolution for DiffServ Quality of Service Management [online], 2006 [retrieved on May 20, 2011]. Retrieved from the Internet< URL: http://citeseerx.ist.psu.edu/viewdoc/download?doi=10.1.1.66.4529&rep=rep1&type=pdf>.*

* cited by examiner

*Primary Examiner* — Jeffrey A Gaffin
*Assistant Examiner* — Nathan Brown, Jr.

(57) ABSTRACT

A method of selectively identifying conflicting network access rules within a knowledge base containing a plurality of network access rules, each rule having a condition portion and a consequence portion, and creating a corresponding resolved consequence, including the steps of comparing the condition portions of the rules, determining conflicting rules to be rules with matching condition portions and differing consequence portions, and analyzing the consequence portions of each of the conflicting rules to define the resolved consequence to be executed when the condition portion in any of the conflicting rules is executed.

21 Claims, 3 Drawing Sheets

SYSTEM AND METHOD FOR IDENTIFYING CONFLICTING NETWORK ACCESS RULES AND CREATING A RESOLVED CONSEQUENCE

BACKGROUND OF THE INVENTION

The present invention relates generally to the useful art of computer software programming and more specifically to software relating to computer networks.

Computer networks are established for, among other reasons, organizing and controlling access to the network's system resources. These networks are typically setup by an administrator and provide access to a defined number of users. However, since these users often have different needs concerning use of the network, administrators usually define network access policies to customize a user's ability to selectively access certain system resources. Such customization also helps to ensure a more secure and efficient network. To implement this customization, the administrator grants and restricts access to certain system resources by applying network access policy rules to a user's network account. Thus, when a user logs into the network, these rules are applied and the user's ability to access system resources is limited accordingly. A plurality of these rules is typically stored in a knowledge base connected to the network.

While different rules are often applied to different users individually, it is also advantageous to create user groups having defined network access rules. For example, a network used in a corporation may have groups such as "Marketing," "Accounting", and "Information Technology (IT)" into which a user may fall. The Marketing group would then have, for example, rules granting its users with access to the marketing server, but also rules for limiting access to unnecessary servers (i.e., the accounting server). Users in groups such as IT likely need access to a much broader array of system resources to troubleshoot IT issues. Thus, depending on a user's needs, different network access rules are associated with each user.

In another example, consider the system resource of network bandwidth. To regulate access to network bandwidth, a limit can be placed on a user's download speed, thus reducing the amount of bandwidth utilized by that user at any given time. For example, a network access rule could limit downloading speed to 200 Mbps for one user (or user group), but only 10 Mbps for another user (or user group).

However a problem exists when two conflicting rules are applied to the same user. Consider the above example with a user who falls into both Group A (which limits download speed to 200 Mbps) and Group B (which limits download speed to 10 Mbps). In such instances, the conflict is resolved in one of two ways. Either the first rule to be applied takes priority and is controlling, thereafter ignoring all other conflicting rules, or each rule is applied in order, thereby continually overwriting the last applied rule. Effectively, the latter situation results in the last rule being applied as the one that controls.

DETAILED DESCRIPTION

The first embodiment of the present invention is a method of selectively identifying conflicting network access rules, creating a corresponding resolved consequence, and executing that consequence. When a user logs into a computer network, it is common that multiple network access rules will be associated with the user. Consider the example of a user who is a member of Group A, which limits his download speed to 200 Mbps, while also being a member of Group B, which limits his download speed to 10 Mbps. Instead of arbitrarily selecting either the first or last rule to be applied, both conflicting rules are analyzed to create a resolved consequence based on a predetermined policy, with the resolved consequence then being applied when any of the corresponding conditions are executed.

The ability to define a predetermined policy allows for flexibility in resolving conflicting rules. For example, the policy could specify that the strictest rule be applied in an effort to preserve system resources. Thus, in the above example, the 10 Mbps download limit would be applied. Alternatively, a least strict policy would apply the 200 Mbps limit. More elaborate policies would, for example, integrate multiple rules by averaging the limits imposed. Thus, in the above example, a limit of 105 Mbps would be applied (averaging 10 Mbps and 200 Mbps). Such policies can be easily modified and regulated as the policies and the resolution steps are contained in a conflict resolution plug-in. The plug-in then connects to a knowledge base containing the network access rules, allowing for easy modification by updating or replacing the plug-in.

Figure 1:
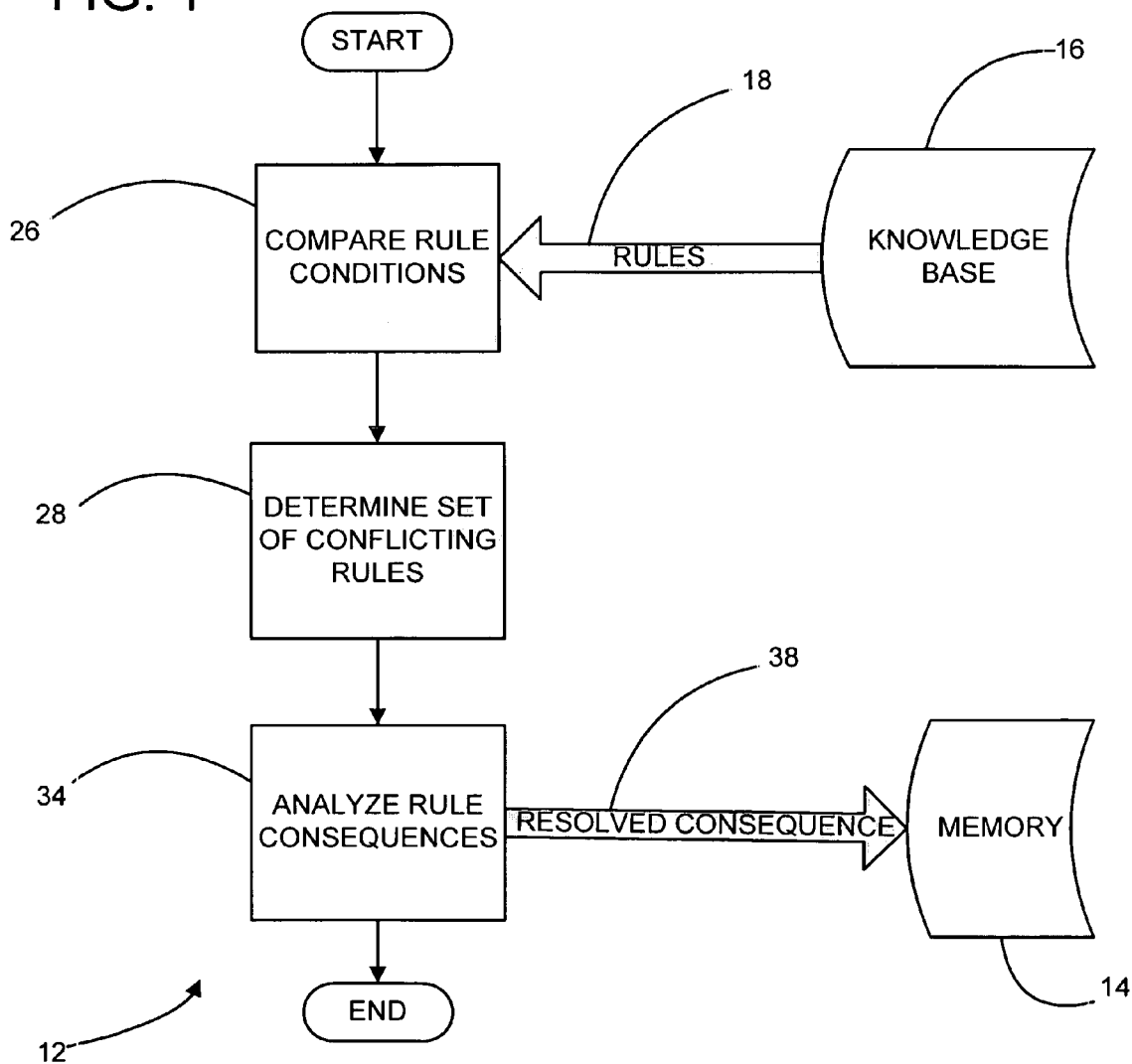
FIG. 1 is a flowchart illustrating the operating steps of the first embodiment of the method of the present invention.

Turning now to FIG. 1, in the first embodiment, a conflict resolution plug-in has a process section, generally designated 12, and a memory section 14. The conflict resolution plug-in is in communication with a knowledge base 16 which contains at least two network access rules 18, which govern access and use of system resources. A system resource includes any resource existing in a computer or a computer network and specifically includes, but is not limited to network bandwidth, servers, databases, folders, files, ports, or application programs. Each rule 18 includes a condition portion and a consequence portion. The condition portion defines a use or attempted use of a system resource and if necessary, specifies details as to the purpose of its use, whereas the consequence portion defines a limit to that resource. Thus, the condition portion is executed when a user attempts to access the corresponding system resource.

For example, a rule 18 that limits download speed to 500 Mbps includes a condition portion (attempting to access bandwidth for downloading) and a consequence portion (a limit of 500 Mbps for download speed). The condition portion is executed when a user attempts to download data in the network and as a result, the consequence portion is executed to limit the download speed. In another example, a rule 18 restricting access to a particular server (e.g., a marketing server) includes a condition portion (attempting to access a marketing server) and a consequence portion (denying the requested access).

The process section 12 of the conflict resolution plug-in carries out a comparing step 26 in which the condition portion of each of the network access rules 18 is compared. A determining step 28 is then performed which identifies conflicting rules 18 as being rules with matching condition portions and differing consequence portions. For example, two conflicting rules 18 could be a rule that allows access to the marketing server and a rule that denies access to a marketing server. As such, the condition portions (attempting to access the marketing server) match, while the consequence portions differ (one consequence allowing access and the other consequence denying access).

It is noted that conflicting rules need not be mutually exclusive as in the previous example. For instance, a rule limiting download speed to 200 Mbps is considered to be in conflict with a rule that limits download speed to 10 Mbps since the rule (attempting to access bandwidth for downloading) is the same, but the consequences differ (having different bandwidth limits). These rules are not mutually exclusive as a user limited to 10 Mbps would logically fall within the limit of 200 Mbps as well. Thus, the consequence portions need not be reciprocal consequences (e.g., one allowing access and one denying access) to determine that the rules are conflicting. Moreover, it is noted that conflicting rules 18 are not limited to two rules, but rather can include any number so long as the determining step 28 identifies the rules as being conflicting. Further, the rules 18 need not be as simplistic as those provided by way of the above examples. To the contrary, rules can have long, intricate condition portions and consequence portions depending on how they are created.

Once conflicting rules are determined, an analysis step 32 is performed on the conflicting rules 18 to define a resolved consequence 38 to be executed when the condition portion in any of the conflicting rules 18 is executed. During the analysis step 34, the consequence portion of each conflicting rule 18 is considered to form the resolution consequence 38. The analysis uses predefined resolved consequence policies to allow for flexibility in the definition of a resolved consequence 38.

For example, the policy could take the consequence portion of one of the conflicting rules 18 and make it the resolved consequence 38 for all the conflicting rules. Further, the policy can define how such a selection is made. The policy can request the least strict or most strict consequence portion, the most strict policy minimizing the use of system resources. Thus, in the example with the rules limiting download speed to 200 Mbps and 10 Mbps, implementing the most strict policy would result in the resolved consequence 38 limiting download speed to 10 Mbps, while the least strict policy would result in the resolved consequence limiting download speed to 200 Mbps.

The policy is also definable as most secure or least secure. Such policies concern the substantive effect of the rules (i.e., pertaining to the actual data or security risk) rather than the actual utilization of system resources. For example, by utilizing a most secure policy, conflicting rules 18 having matching condition portions of attempting to access multiple servers, and having differing consequence portions (granting access to different servers), could define the resolved consequence as granting access to the server having the least confidential or secure data. However, analyzing the same conflicting rules 18 under a most strict policy could result in providing access to a different one of those servers (i.e., the one utilizing the least resources).

The analysis step 34 is not limited to selecting one of the consequence portions of the conflicting rules 18 to be the resolve consequence 38. Instead, the policy can provide for an aggregate solution, whereby the resolved consequence 38 is formed by combining elements of the consequence portions.

For example, consider again the conflicting rules limiting download speed to 200 Mbps and 10 Mbps, respectively. Under an aggregate policy, the resolved consequence need not limit downloading speed to either 200 Mbps or 10 Mbps. Instead, the resolved consequence can be a third value. One example would be 105 Mbps, the average of the two limits. This aggregation technique can further be integrated with any of the most strict, least strict, most secure, or least secure policies, thus giving the administrator complete control over the policy to be applied to the conflicting rule 18. It is noted that other policies could be defined as would be required to address the types of rules 18 in the knowledge base 16 and the expected conflicting rules 18 that would result. The analysis step 34 can also consider input from any number of network devices (e.g., routers, switches) which monitor network activity. Thus, the analysis step 34 allows for the creation of a resolved consequence 38 based on the current network status.

The resolved consequence 38 is then executed when the condition portion of any conflicting rule 18 (each condition portions being equivalent) is executed. The comparing, determining, and analyzing steps 26, 28, 34 are then repeated until all conflicting rules 18 and corresponding resolved consequences 38 are defined. In addition, the conflict resolution plug-in encapsulates the steps 26, 28, 34 in the process section 12 and stores the resulting conflicting rules 18 and resolved consequences 38 in the memory section 14. Preferably, the resolved consequence policies are also stored in the memory 14. Such modularization and centralization of data and processes provide for a plug-in 10 that is independently removable and replaceable with another conflict resolution plug-in, thus allowing for plug-ins to be designed and easily implemented to interact with various knowledge bases 16. The steps 26, 28, 34 can also be periodically repeated if it is desired to create resolved consequences 38 based on the network status (as the status will change frequently).

Figure 2:
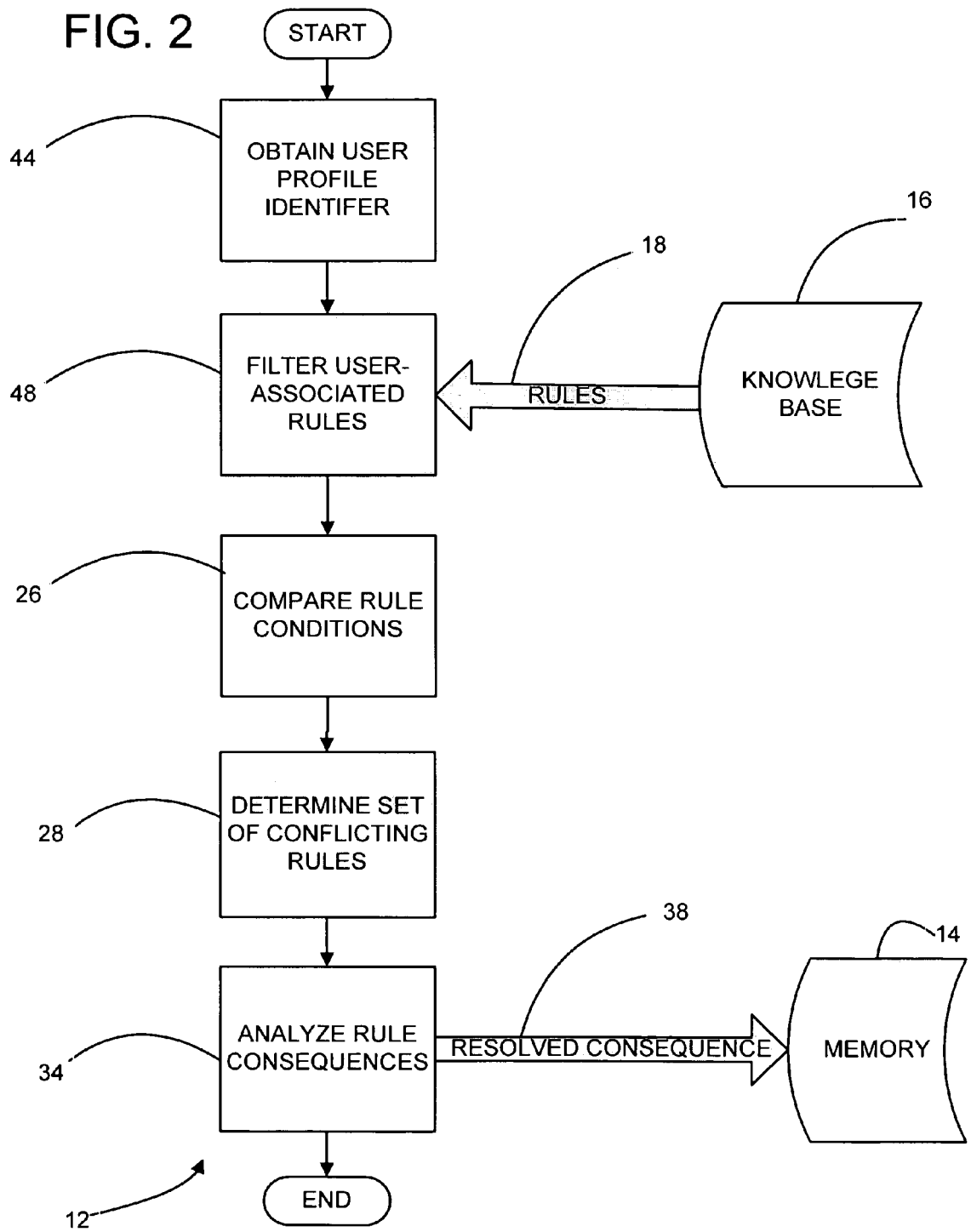
FIG. 2 is a flowchart illustrating the operating steps of a second embodiment of the method of the present invention.
Figure 3:
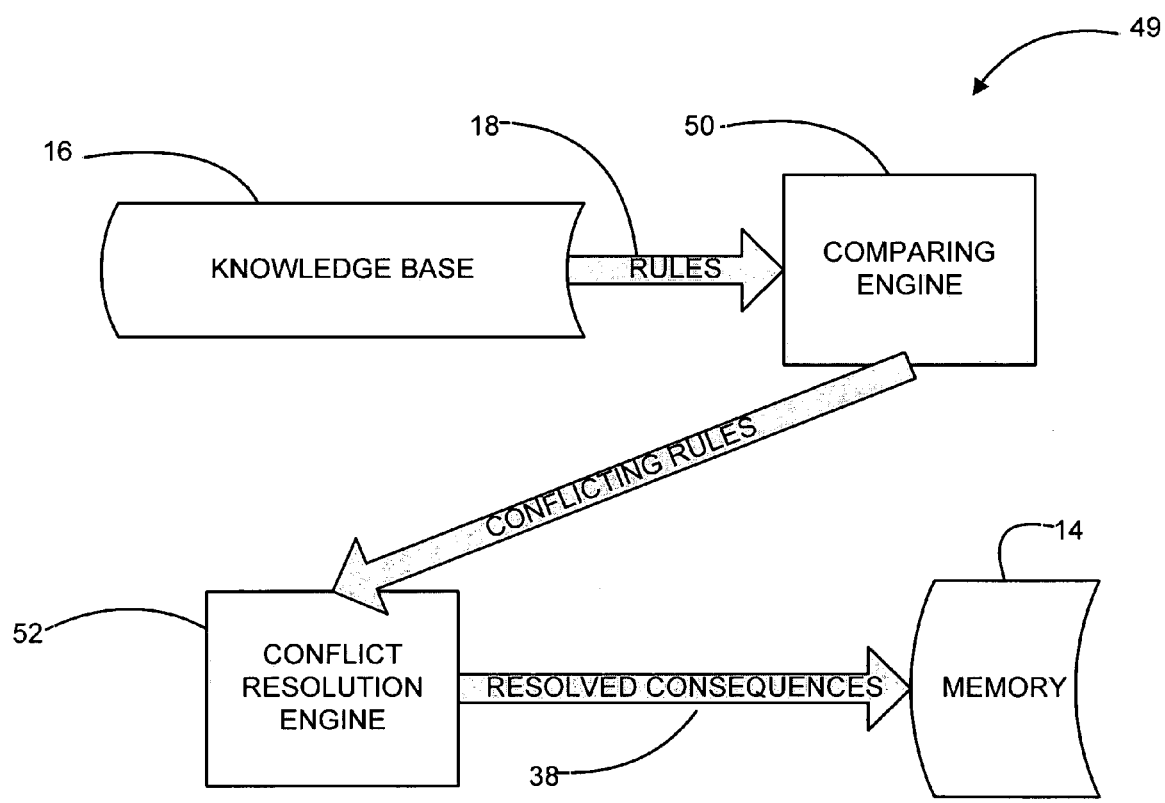
FIG. 3 is a flowchart illustrating a third embodiment of a system of the present invention.

Referring now to FIG. 2, it is noted that some rules 18 in a knowledge base 16 are associated only with specific users and are organized according to user groups. Those rules 18 are assigned to a user group and therefore apply to all the users in that group. A user profile identifier links a user to any such associated user groups. To properly identify conflicting rules 18 in this instance, a second embodiment performs the step 44 of obtaining a user profile identifier and is followed by a step 48 of filtering out a subset of rules 18 from the knowledge base 16, such that only the rules 18 pertaining to that user undergo the comparing, determining, and analyzing steps 26, 28, 34 as defined in the first embodiment.

A third embodiment of the present invention is a conflict resolution system 49 for selectively identifying conflicting network access rules and creating a resolved consequence. The system 48 has the knowledge base 16 storing a plurality of rules 18 with the condition portion and the consequence portion. The system 49 also includes a comparing engine 50 which receives the rules 18 and compares the condition portions to identify conflicting rules 18 as being the rules 18 with matching condition portions and differing consequence portions. Further included in the system 49 is a conflict analysis engine 52 which receives the conflicting rules 18 from the comparing engine 50, analyzes the condition portion of the rules 18, and determines a resolved consequence 38. The system 49 can also include a memory where the resolved consequence policy is stored and sent to the conflict analysis engine 52 to define a resolved consequence 38.

While several particular embodiments of the system and method for selectively identifying conflicting network access rules and creating a corresponding resolved consequence have been described herein, it will be appreciated by those skilled in the art that changes and modifications may be made thereto without departing from the invention in its broader aspects and as set forth in the following claims.

What is claimed is:

1. A method of selectively identifying conflicting network access rules within a knowledge base containing a plurality of network access rules, each rule having a condition portion and a consequence portion, and creating a corresponding resolved consequence, comprising the steps of:
   comparing the condition portions of the rules;
   determining conflicting rules to be rules with matching condition portions and differing consequence portions; and
   analyzing the consequence portions of each of said conflicting rules to define the resolved consequence to be executed when said condition portion in any of said conflicting rules is executed.

2. The method of claim 1 further comprising:
   providing a conflict resolution plug-in in communication with the knowledge base, wherein said conflict resolution plug-in performs said comparing, said determining, said analyzing steps.

3. The method of claim 2 further comprising:
   repeating said comparing step, said determining step, and said analyzing step based on an input from a network device monitoring network status, until all of said conflicting rules are determined and resolved.

4. The method of claim 2 wherein said conflict resolution plug-in is independently removable and replaceable with another said conflict resolution plug-in.

5. The method of claim 4 wherein said conflict resolution plug-in has a memory and said conflicting rules and the resolved consequence are stored in said memory.

6. The method of claim 1 wherein the resolved consequence is executed when said condition portion of any of said conflicting rules is executed.

7. The method of claim 6 wherein said comparing step, said determining step, and said analyzing step are repeated until all of said conflicting rules are determined and resolved by executing the corresponding resolved consequence.

8. The method of claim 1 further comprising:
   obtaining a user profile identifier associated with a user group, wherein each said rule further includes a user group; and
   filtering a subset of said rules including said rules being associated with said user group, wherein said comparing step, is performed on said subset of said rules.

9. The method of claim 1 wherein said condition portion of one of said rules is executed when a user attempts to access a system resource.

10. The method of claim 9 wherein said system resource is selected from the group comprising:
    network bandwidth;
    a server;
    a database;
    a folder;
    a file;
    a port; and
    an application program.

11. The method of claim 9 wherein said consequence portion defines access limits to said system resource.

12. The method of claim 1 wherein said resolved consequence is defined by choosing the consequence portion of one of said conflicting rules.

13. The method of claim 11 wherein said resolved consequence is defined according to a policy selected from the group comprising:
    choosing a least strict said consequence portion;
    choosing a most strict said consequence portion;
    choosing a least secure said consequence portion;
    choosing a most secure said consequence portion.

14. The method of claim 1 wherein said resolved consequence is defined by combining components of the consequence portion of at least two said conflicting rules.

15. The method of claim 14 wherein said resolved consequence is defined according to a policy selected from the group comprising:
    combining the least strict said components;
    combining the most strict said components;
    combining the least secure said components;
    combining the most secure said components.

16. A method of selectively identifying conflicting network access rules within a knowledge base containing a plurality of network access rules, each rule having a condition portion and a consequence portion, and creating a corresponding resolved consequence, comprising the steps of:
    providing a conflict resolution plug-in having a memory;
    defining resolved consequence policies and storing them in said memory;
    connecting said conflict resolution plug-in to said knowledge base;
    said conflict resolution plug-in comparing the condition portions of the rules;
    said conflict resolution plug-in determining conflicting rules to be rules with matching condition portions;
    analyzing the consequence portions of each of said conflicting rules according to said resolved consequence policies; and
    defining the resolved consequence to be executed when said condition portion in any of said conflicting rules is executed.

17. The method of claim 16 wherein said conflicting rules are further defined as rules with differing consequence portions.

18. The method of claim 16 wherein said conflicting rules and the resolved consequence are stored in said memory.

19. The method of claim 16 wherein the resolved consequence is executed when said condition portion of any of said conflicting rules is executed.

20. A conflict resolution system for selectively identifying conflicting network access rules and creating a resolved consequence, comprising:
    a knowledge base;
    a plurality of network access rules stored in said knowledge base, each said rule having a condition portion and a consequence portion;
    a comparing engine, the comparing engine receiving said rules and comparing said condition portion to identify conflicting rules being said rules with matching said condition portions and differing said consequence portions;
    a conflict analysis engine, the conflict analysis engine receiving said conflicting rules from said comparing engine, analyzing said condition portion of said rules, and determining a resolved consequence; and
    a memory storing the resolved consequence.

21. The conflict resolution system of claim 20, wherein said memory further stores a resolved consequence policy and said resolved consequence policy is sent to said conflict analysis engine to define a resolved consequence.

* * * * *